US012762169B2

(12) United States Patent
Joshi et al.

(10) Patent No.: US 12,762,169 B2
(45) Date of Patent: Oct. 13, 2026

(54) SUMMARY CONTENT GENERATION AND VALIDATION FOR PARTS ON LISTING PLATFORMS

(71) Applicant: eBay Inc., San Jose, CA (US)

(72) Inventors: Sachin Joshi, San Jose, CA (US); Rajkumar Varadharajan, Cupertino, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/962,924

(22) Filed: Nov. 27, 2024

(65) Prior Publication Data

US 2026/0147815 A1 May 28, 2026

(51) Int. Cl.
*G06N 3/00* (2023.01)
*G06F 16/00* (2019.01)
(Continued)

(52) U.S. Cl.
CPC ........ *G06F 16/338* (2019.01); *G06F 16/2228* (2019.01); *G06F 16/242* (2019.01);
(Continued)

(58) Field of Classification Search
CPC .. G06F 16/338; G06F 16/345; G06F 16/0641; G06F 16/2228; G06F 16/285;
(Continued)

(56) References Cited

U.S. PATENT DOCUMENTS 8,290,818 B1 * 10/2012 Levitan .............. G06Q 30/0631
705/26.7
8,584,088 B1 * 11/2013 Carrick ..................... G06F 8/74
717/124

(Continued)

FOREIGN PATENT DOCUMENTS

WO WO2010022302 A1 * 2/2010
WO WO2022224246 A1 * 10/2022

(Continued)

OTHER PUBLICATIONS

Shiladitya Chatterjee, ACIT5900 Master Thesis in Applied Computer and Information Technology (ACIT) Applied Artificial Intelligence "GenerativeAutoAi—A generative model for cars", Department of Computer Science Faculty of Technology, Art and Design, Aug. 2023, pp. 1-93.*

(Continued)

*Primary Examiner* — Srirama Channavajjala

(74) *Attorney, Agent, or Firm* — Shook Hardy & Bacon L.L.P.

(57) ABSTRACT

Some aspects relate to technologies for generating and validating content providing summary information for parts on a listing platform, such as compatibility information and item characteristic information for the parts. In some aspects, input data comprising attribute-value pairs based on one or more items is accessed for content generation. The input data and one or more pre-defined generation prompts are provided to a first generative model, which generates content comprising natural language text as output. In some aspects, the content is validated by providing the content and one or more pre-defined validation prompts to a second generative model. If approved, the content can be provided for presentation on a user device. If rejected, the content is not provided for presentation. In further aspects, the rejected content is used by a third generative model for tuning the pre-defined generation prompts.

19 Claims, 7 Drawing Sheets

(51) Int. Cl.

| | |
|---|---|
| ***G06F 16/22*** | (2019.01) |
| ***G06F 16/242*** | (2019.01) |
| ***G06F 16/2457*** | (2019.01) |
| ***G06F 16/28*** | (2019.01) |
| ***G06F 16/338*** | (2019.01) |
| ***G06F 16/34*** | (2019.01) |
| ***G06N 3/045*** | (2023.01) |
| ***G06N 3/0464*** | (2023.01) |
| ***G06N 3/0475*** | (2023.01) |
| ***G06N 3/082*** | (2023.01) |
| ***G06N 3/094*** | (2023.01) |
| ***G06N 5/022*** | (2023.01) |
| ***G06N 20/00*** | (2019.01) |
| ***G06Q 30/0601*** | (2023.01) |

(52) U.S. Cl.
CPC ...... *G06F 16/24578* (2019.01); *G06F 16/285* (2019.01); *G06F 16/345* (2019.01); *G06N 3/045* (2023.01); *G06N 3/0464* (2023.01); *G06N 3/0475* (2023.01); *G06N 3/082* (2013.01); *G06N 3/094* (2023.01); *G06N 5/022* (2013.01); *G06N 20/00* (2019.01); *G06Q 30/0641* (2013.01)

(58) Field of Classification Search
CPC ............. G06F 16/242; G06F 16/24578; G06F 16/24522; G06Q 30/0631; G06Q 30/0625; G06Q 30/0633; G06Q 30/601; G06Q 30/0282; G06Q 30/0203; G06N 5/022; G06N 3/0475; G06N 3/045; G06N 3/0464; G06N 3/09; G06N 3/094; G06N 3/082; G06N 3/048; G06N 20/00; G06N 20/10
See application file for complete search history.

(56) References Cited

U.S. PATENT DOCUMENTS

| | | | | |
|---|---|---|---|---|
| 11,327,996 | B2 * | 5/2022 | Reynolds | G06F 16/215 |
| 11,992,768 | B2 * | 5/2024 | Akhoundi | A63F 13/655 |
| 12,061,970 | B1 * | 8/2024 | Lo | G06N 3/0455 |
| 12,393,621 | B2 * | 8/2025 | Mansour | G06F 40/20 |
| 2012/0016678 | A1 * | 1/2012 | Gruber | B60K 35/00 704/E21.001 |
| 2017/0358295 | A1 * | 12/2017 | Roux | G06F 16/3329 |
| 2019/0370695 | A1 * | 12/2019 | Chandwani | G06F 18/214 |
| 2020/0401111 | A1 * | 12/2020 | Zubarev | G06N 20/00 |
| 2024/0257199 | A1 * | 8/2024 | Unnikrishnan | G06Q 30/0202 |
| 2024/0281663 | A1 * | 8/2024 | Chen | G06N 3/0895 |
| 2024/0331003 | A1 * | 10/2024 | Saad | G06Q 30/0627 |
| 2024/0378391 | A1 * | 11/2024 | Bradley | G06F 40/35 |
| 2025/0005050 | A1 * | 1/2025 | Krishnan | G06F 16/3329 |
| 2025/0094506 | A1 * | 3/2025 | Sachindran | G06F 16/345 |
| 2025/0156455 | A1 * | 5/2025 | Subbiah | G06F 16/3335 |
| 2025/0165463 | A1 * | 5/2025 | Brenner | G06F 16/242 |

FOREIGN PATENT DOCUMENTS

| | | | |
|---|---|---|---|
| WO | WO 2023109483 | A1 * | 6/2023 |
| WO | WO2024130215 | A1 * | 6/2024 |
| WO | WO 2025058613 | A1 * | 3/2025 |

OTHER PUBLICATIONS

Kris Sankaran "Generative Models An Interdisciplinary Perspective", Annual Review of Statistics and Its Application vol. 10, 2023, pp. 325-352.*

Sheng Yang et al., "Named Entity Recognition Based on Large Language Model and Instruction Tuning", 2024 5th International Conference on Big Data & Artificial Intelligence & Software Engineering (ICBASE) (Sep. 2024, pp. 336-343).*

Li Zhang et al., "Defect Correction Method for Software Requirements Text Using Large Language Models", 2024 International Joint Conference on Neural Networks (IJCNN) (Jul. 2024, pp. 1-8).*

Azov et al., "Self-Improving Customer Review Response Generation Based on LLMs", Available online at: <https://arxiv.org/abs/2405.03845>, May 6, 2024, 18 pages.

Extended European Search Report received for European Patent Application No. 25215860.5, mailed on Apr. 9, 2026, 10 pages.

Lau et al., "ECOMEDIT: An Automated E-commerce Knowledge Editing Framework for Enhanced Product and Purchase Intention Understanding", Available online at: <https://arxiv.org/abs/2410.14276>, Oct. 18, 2024, pp. 1-9.

Yan, Ziyou, "Evaluating the Effectiveness of LLM-Evaluators (aka LLM-as-Judge)", Available online at: <https://eugeneyan.com/writing/llm-evaluators/>, Aug. 2024, 43 pages.

* cited by examiner

202

{“SECTIONWIDTH”:215,“ASPECTRATIO”:45,“RIMDIAMETER”:17,“POPULARMAKEMODELS”:[{“MAKE”:“TOYOTA”,“MODEL”:“COROLLA”},{“MAKE”:“HONDA”,“MODEL”:“CIVIC”},{“MAKE”:“HYUNDAI”,“MODEL”:“ELANTRA”}]}

*FIG. 2A*

204

THE 215/45R17 TIRE SIZE IS COMMON ON VEHICLES SUCH AS TOYOTA COROLLA, HONDA CIVIC, AND HYUNDAI ELANTRA. THIS MODERATE-WIDTH TIRE, COUPLED WITH A MODERATE SIDEWALL, STRIKES A BALANCE BETWEEN PERFORMANCE AND AESTHETICS, PROVIDING A SMOOTH DRIVING EXPERIENCE IDEAL FOR EVERYDAY USE.

*FIG. 2B*

302

TIRE WITH SECTIONWIDTH < 201 IS CONSIDERED NARROW, SECTIONWIDTH IN RANGE 201 TO 250 IS CONSIDERED MODERATE, SECTIONWIDTH > 250 IS CONSIDERED WIDE

TIRE WITH ASPECTRATIO < 41 IS CONSIDERED LOW SIDEWALL, ASPECTRATIO IN RANGE 41 TO 60 IS CONSIDERED MODERATE SIDEWALL, ASPECTRATIO > 60 OR HIGHER IS CONSIDERED TALL SIDEWALL

DO NOT MENTION GROUND CLEARANCE, TRACTION, TERRAIN OR LOAD-CARRYING CAPACITY IN THE TEXT RESPONSE

DO NOT MENTION ANY KIND OF GUARANTEE, DISCOUNT, WARRANTY, PROMOTION, OR PRICE IN TEXT RESPONSE

AVOID REFERENCES TO SAFETY OR RELATED TERMS SUCH AS 'SAFE' OR 'ACCIDENT'

REFRAIN FROM MAKING ANY NEGATIVE OR DISPARAGING COMMENTS ABOUT THE TIRE

MUST INCLUDE ONLY INPUT MAKE MODELS IN THE TEXT RESPONSE, OTHERWISE DON'T INCLUDE ANY MAKE MODELS

MUST INCLUDE AT LEAST 3 DIFFERENT MAKES IN THE TEXT RESPONSE, OTHERWISE DON'T INCLUDE ANY MAKE MODELS

ANY MENTION OF SPECIFIC TIRE BRANDS IS PROHIBITED

...

*FIG. 3*

402

REVIEW THE TEXT AND INPUT DATA TO DETERMINE IF THE TEXT MENTIONS: A TIRE WIDTH AS NARROW IF SECTIONWIDTH < 201; A TIRE WIDTH AS MODERATE IF SECTIONWIDTH IN RANGE 201 TO 250; A TIRE WIDTH AS WIDE IF SECTIONWIDTH > 250. IF THE TEXT MENTIONS A TIRE WIDTH CHARACTERISTIC THAT DOES NOT MATCH THE SECTIONWIDTH VALUE, PLEASE GENERATE A DESCRIPTION OF WHAT TIRE WIDTH CHARACTERISTIC IS MENTIONED AND THE SECTIONWIDTH VALUE. OTHERWISE CONFIRM THAT THE TEXT SATISFIES THE REQUIREMENT

REVIEW THE TEXT AND INPUT DATA TO DETERMINE IF THE TEXT MENTIONS: A LOW SIDEWALL IF ASPECTRATIO < 41; A MODERATE SIDEWALL IF ASPECTRATIO IN RANGE 41 TO 60; A TALL SIDEWALL IF ASPECTRATIO > 60 OR HIGHER. IF THE TEXT MENTIONS A SIDEWALL CHARACTERISTIC THAT DOES NOT MATCH THE ASPECTRATIO VALUE, PLEASE GENERATE A DESCRIPTION OF WHAT SIDEWALL CHARACTERISTIC IS MENTIONED AND THE ASPECTRATIO VALUE. OTHERWISE CONFIRM THAT THE TEXT SATISFIES THE REQUIREMENT

REVIEW THE TEXT AND DETERMINE IF IT MENTIONS ANY OF THE FOLLOWING: GROUND CLEARANCE, TRACTION, TERRAIN OR LOAD-CARRYING CAPACITY. IF ANY OF THESE ARE MENTIONED, PLEASE INDICATE WHICH ONES ARE PRESENT. IF NONE OF THESE ARE MENTIONED, CONFIRM THAT THE TEXT SATISFIES THE REQUIREMENT

REVIEW THE TEXT AND DETERMINE IF IT MENTIONS ANY OF THE FOLLOWING: GUARANTEE, DISCOUNT, WARRANTY, PROMOTION, OR PRICE. IF ANY OF THESE ARE MENTIONED, PLEASE INDICATE WHICH ONES ARE PRESENT. IF NONE OF THESE ARE MENTIONED, CONFIRM THAT THE TEXT SATISFIES THE REQUIREMENT

REVIEW THE TEXT AND DETERMINE IF IT MENTIONS ANY REFERENCES TO SAFETY OR RELATED TERMS SUCH AS 'SAFE' OR 'ACCIDENT'. IF ANY OF THESE ARE MENTIONED, PLEASE INDICATE WHICH ONES ARE PRESENT. IF NONE OF THESE ARE MENTIONED, CONFIRM THAT THE TEXT SATISFIES THE REQUIREMENT

REVIEW THE TEXT AND DETERMINE IF IT MENTIONS ANY NEGATIVE OR DISPARAGING COMMENTS ABOUT THE TIRE. IF ANY OF THESE ARE MENTIONED, PLEASE INDICATE WHICH ONES ARE PRESENT. IF NONE OF THESE ARE MENTIONED, CONFIRM THAT THE TEXT SATISFIES THE REQUIREMENT

...

*FIG. 4*

SUMMARY CONTENT GENERATION AND VALIDATION FOR PARTS ON LISTING PLATFORMS

BACKGROUND

Listing platforms, such as e-commerce websites, are online platforms that offer items (e.g., products) to users by providing user interfaces to user devices to allow users to find item listings for items to purchase. Such platforms typically offer a vast number of item listings, with each item listing offering a particular item for sale. While some item listings are relevant to any given user, the majority is not. As a result, item retrieval for listing platforms is a particular Internet-centric problem that has proven to be difficult to fully address. That is, given a large number of item listings available on a listing platform, what item listings should be retrieved and presented to a user. Given the vast number of item listings available, listing platforms include item retrieval functionality, such as search and recommendation, to assist users in finding item listings of interest on the platforms. For instance, listing platforms often provide search capabilities that receive user queries and return search results identifying item listings relevant to the user queries. Listing platforms also often leverage recommendation systems to recommend item listings that are likely of interest to users based on a variety of information, such as an item listing currently being viewed by a user, user attributes, and user behavior on the listing platforms (e.g., previous item views, purchases, etc.).

SUMMARY

Some aspects of the present technology relate to, among other things, a system that generates and validates summary content for parts on listing platforms, such as e-commerce websites. The summary content can include, for instance, natural language text providing compatibility information and/or item characteristic information for one or more part item listings that can be presented as users navigate websites of listing platforms.

The system includes a content generation component that uses a generative model to generate summary content for one or more part item listings based on input data that comprises structured data in the form of attribute-value pairs. The attribute-value pairs can be based on fitment data and item attributes for the part item listing(s). To ensure the generated content is accurate and relevant, the system also provides one or pre-defined generation prompts to the generative model. The pre-defined prompts guide the generative model by providing specific instructions or examples, which help reduce hallucinations in the generated content.

The system also includes a content validation component that uses a generative model to validate the content generated by the content generation component. The generated content and one or more pre-defined validation prompts are provided to the generative model to validate the content. Based on this input, the content validation component determines if the content contains any hallucinations. If the content is approved by the content validation component, the content can be provided for presentation on user device(s). Alternatively, if the content is rejected by the content validation component, the content is not provided for presentation on user device(s).

In some aspects, when content is rejected by the content validation component, a prompt tuning component generates one or more tuned generation prompts based on the rejected content, and the tuned generation prompt(s) are added to a repository of pre-defined generation prompts for the system. A tuned generation prompt provided by the prompt tuning component can be a new generation prompt or a previous pre-defined generation prompt that has been tuned based on the rejected content. This helps to further refine the pre-defined generation prompts to further reduce hallucinations and maintain the reliability and relevance of the summary content.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIGS. 2A and 2B is a diagram showing an example of input data and generated content in accordance with some implementations of the present disclosure;

FIG. 3 is a diagram showing example generation prompts in accordance with some implementations of the present disclosure;

FIG. 4 is a diagram showing example validation prompts in accordance with some implementations of the present disclosure;

DETAILED DESCRIPTION

Overview

Figure 1:
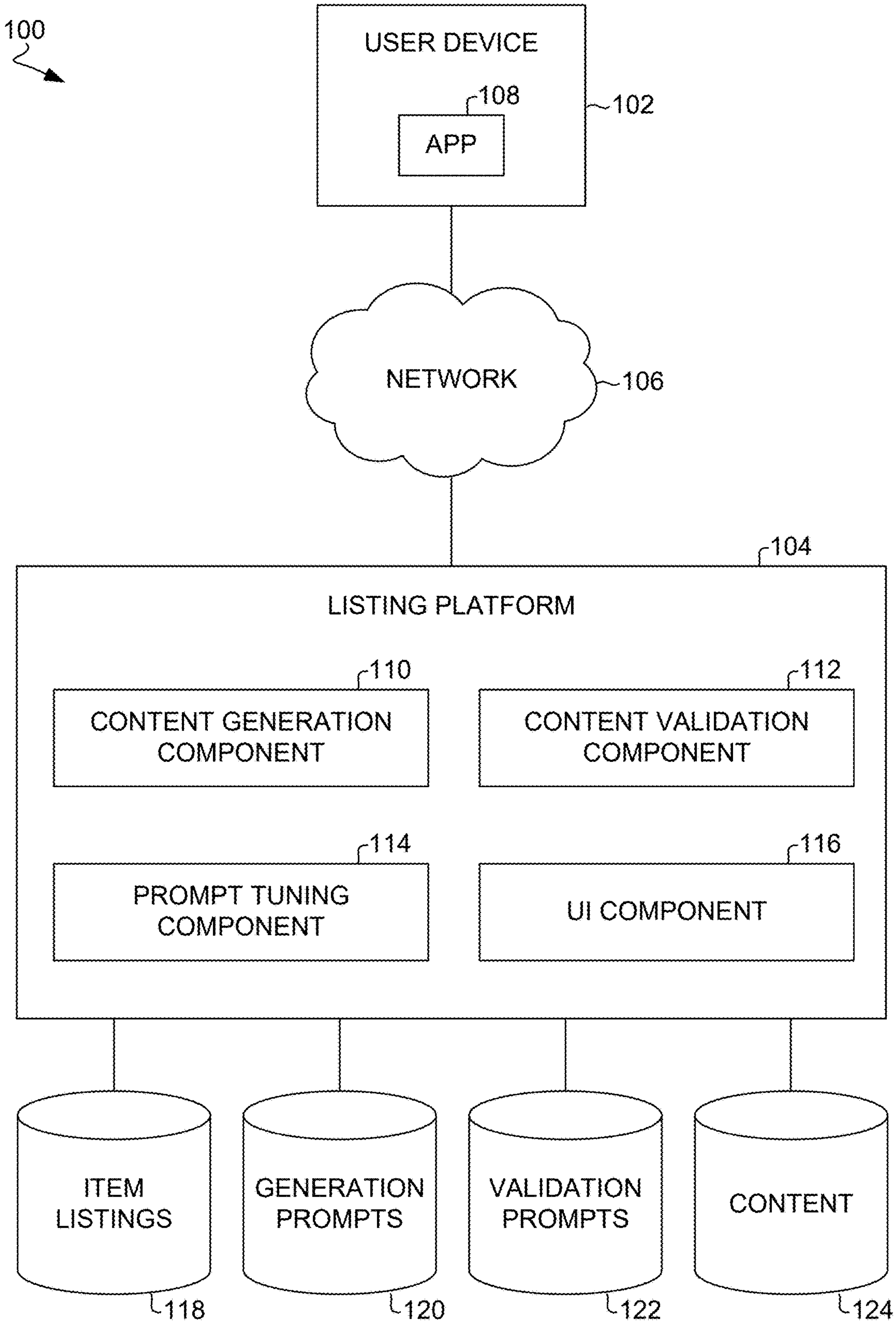
FIG. 1 is a block diagram illustrating an exemplary system in accordance with some implementations of the present disclosure.

Many listing platforms (e.g., e-commerce websites) offer a large number of item listings and also serve a large number of visitors. For instance, it has been reported that as of 2023, the eBay listing platform has 1.7 billion item listings, and the monthly number of visits to eBay websites reached almost 3 billion. Each user visit to the website of a listing platform involves servers of the listing platform processing user inputs and providing, over a network, digital content to a user device of the user as the user navigates the website. This can include, for instance, providing search result pages in response to search input, browse node pages in response to users browsing the website or navigation from external sources, and item pages when users select to view information for particular item listings.

Given the vast number of available item listings and user visits, listing platforms require significant server resources to ensure smooth performance and quick load times, even during peak traffic periods, as well as advanced database management systems to efficiently organize and retrieve item listing information. As a result, listing platforms demand extensive server processing and storage resources to handle the dynamic and high-demand environment effectively. Many listing platform providers attempt to design their server systems to provide relevant item listings to users as quickly and efficiently as possible in order to reduce the computing resource consumption required for the user visits. For instance, if the search system of the listing platform is ineffective in returning relevant search results, users will submit additional search queries until relevant search results are returned. These repetitive search queries can exponentially increase the computer resource consumption of the listing platform (e.g., increased bandwidth, memory, and CPU usage). Additionally, users often repeatedly select to view item pages for different item listings until they find relevant items. This requires the servers of the listing platform to repeatedly retrieve data from storage and provide the item pages to the user devices, also increasing computer resource consumption.

One area that presents a particular challenge for listing platforms is dealing with item listings for parts (sometimes referred to herein as part item listings). Parts are items specifically designed to be compatible with certain applications, ensuring they fit and function correctly within a larger system. For example, an ink cartridge is a part that must be compatible with a particular model of printer (i.e., the application) to ensure proper printing performance. The term "part" is used herein to refer to any item that involves compatibility, including required parts and optional accessories. The compatibility requirement for parts presents a significant challenge for listing platforms, as parts must be matched with the correct applications.

Users navigating the websites of listing platforms frequently struggle to find the necessary details for parts, such as compatibility and specific characteristics of the various parts. In some cases, this information is missing from item pages; while in other cases, the information is inconsistently presented across different item listings, forcing users to sift through descriptions on various item pages to locate the information they need. One potential solution is to generate and provide summary information for parts, highlighting compatibility and key characteristics of the parts. However, manually creating these summaries is impractical due to the sheer volume of items, as well as the dynamic nature of item listings being added or removed from listing platforms. Additionally, some use cases would require real-time generation of summary information based on current data or for personalization to individual users, making pre-generated content for such use cases infeasible. An alternative approach involves using generative models to automatically generate summary information for parts on listing platforms. However, this poses its own challenges, as generative models can produce inaccurate content due to hallucinations. This is a particular problem for parts given the compatibility requirements of such items. As used herein, a hallucination refers broadly to any inaccurate or otherwise unwanted information included in content generated by a generative model.

Aspects of the technology described herein improve the functioning of server systems for listing platforms by providing a system that generates and validates summary content for part item listings that reduces hallucinations in the generated content and prevents content with hallucinations from being presented to users. The summary content can include, for instance, natural language text providing compatibility information and/or item characteristic information for one or more part item listings. The summary content can be provided for a number of use cases, such as, for instance: providing summary information for a part item listing on an item page for the part item listing; providing summary information for part item listings in search results on a search results page; providing summary information for part item listings on a browse node page; and providing summary information for part item listings included in a set of item recommendations.

In accordance with some aspects, a content generation component uses a generative model to generate summary content for one or more part item listings based on input data comprising structured data in the form of attribute-value pairs. These attribute-value pairs can be based on fitment data, which includes compatibility information of the part(s) with relevant applications (e.g., vehicle make and model for a tire) and item attributes, which provide specific characteristics of the part(s) (e.g., tire size). The input data can be selected based on various factors such as: an item category of the part item listing(s), the use case (e.g., where the summary content is to be presented, such as on an item page, on a search results page, on a browse node page, or with item recommendation), system knowledge (e.g., from query logs, purchase data), and/or user data (e.g., user demographics, user behavior, items owned by the user). The use of structured data as input to the generative model helps the generative model produce summary content that is accurate for the part item listing(s) for which the summary content is being generated.

To help reduce hallucinations, the content generation component also provides one or more pre-defined generation prompts to the generative model. These pre-defined generation prompts comprise text (e.g., natural language text, soft prompts, embeddings, templates) that guides the generative model by providing specific instructions or examples, which help reduce hallucinations in the generated content. The pre-defined generation prompts can be selected from a repository of pre-defined generation prompts based on factors such as the item category, the use case, system knowledge, and/or user data. For example, pre-defined generation prompts for generating content about vehicle tires might include rules for describing tire width based on section width values, while other pre-defined generation prompts might instruct the generative model to avoid mentioning guarantees or prices.

While the use of input data and pre-defined generation prompts reduce hallucinations in generated summary content, the generative model can still generate content with hallucinations. To prevent generated content with hallucinations from being presented to users, in some aspects, a content validation component uses a generative model to validate the content generated by the content generation component. The generated content and one or more pre-defined validation prompts are provided to the generative model to validate the content. The pre-defined validation prompts comprise text (e.g., natural language text, soft prompts, embeddings, templates) that instruct or guide the generative model to assess the validity of the generated content. The pre-defined generation prompts can be specific to item categories or generally applicable across item categories. For example, a pre-defined validation prompt specific to vehicle tires might instruct the generative model to verify that the text correctly describes tire width based on section width values. An example of a general pre-defined validation prompt might instruct the generative model to check for the presence of prohibited terms such as guarantees or prices. The pre-defined validation prompts can be selected from a repository of pre-defined validation prompts based on factors such as the one or more pre-defined generation prompts used to generate the content, the item category, the use case, system knowledge, and/or user data. Based on this input, the content validation component determines if the content contains any hallucinations. If the content is approved by the content validation component, it can be provided for presentation on user device(s). Alternatively, if the content is rejected by the content validation component, it is not provided for presentation on user device(s).

In some aspects, when content is rejected by the content validation component, a prompt tuning component uses a generative model to generate one or more tuned generation prompts based on the rejected content. The input to the generative model can include the rejected content, text output from the content validation component regarding why the content was rejected, one or more pre-defined validation prompts that resulted in the rejection, and/or one or more pre-defined generation prompts associated with the rejected content. The prompt tuning component can generate a new generation prompt or tune an existing pre-defined generation prompt based on the rejected content. The tuned generation prompt(s) are added to a repository of pre-defined generation prompts for the system. This process helps to refine the pre-defined generation prompts, further reducing hallucinations and maintaining the reliability and relevance of the summary content. The tuned generation prompts can be used to generate new content for the same input data that resulted in the rejected content and/or to generate content for subsequently received input data.

Aspects of the technology described herein provide a number of improvements for server systems of listing platforms. For instance, the technology described herein is able to leverage generative models to automatically generate content for part item listings on listing platforms to provide summary information for presentation that is free from hallucinations. The summary information provides compatibility information and/or item characteristics information for part item listings being viewed (e.g., on an item page, on a search results page, on a browse node page, with item recommendations), allowing users to more quickly find relevant parts. This reduces the number of user inputs (e.g., requests for item pages, search input, browse node navigations) and corresponding responses processed by the server systems. Given the number of item listings available on listing platforms and the number of user visits, this technology significantly reduces the computer resource consumption (e.g., bandwidth, memory, and CPU usage) for the server system.

Various aspects of the technology described herein also address the challenges of using generative models for automatic content generation for parts on listing platforms through a number of different techniques that reduce hallucinations and prevent the presentation of content with hallucinations. First, the use of structured data in the form of attribute-value pairs provide clear and specific information about item attributes and/or fitment data, ensuring the generative model has accurate input data. Second, the use of pre-defined generation prompts that guide the generative model with specific instructions and/or examples reduces hallucinations by optimizing how content generation tasks are presented to the generative model. Third, the content validation component uses a generative model to validate the generated content against pre-defined validation prompts, ensuring that any hallucinations are detected and the content is either approved or rejected based on its accuracy. Finally, the prompt tuning component generates tuned generation prompts based on rejected content, refining the generation prompts to further reduce hallucinations and maintain the reliability and relevance of the summary content.

Example System for Summary Content Generation and Validation for Parts

With reference now to the drawings, FIG. 1 is a block diagram illustrating an exemplary system 100 for generating and validating content with summary information for parts in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and a listing platform 104. Each of the user device 102 and the listing platform 104 shown in FIG. 1 can comprise one or more computer devices, such as the computing device 700 of FIG. 7, discussed below. As shown in FIG. 1, the user device 102 and the listing platform 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present technology. Each can comprise a single device or multiple devices cooperating in a distributed environment. For instance, the listing platform 104 could be provided by multiple server devices collectively providing the functionality of the listing platform 104 as described herein. Additionally, other components not shown may also be included within the network environment.

The user device 102 can be a client device on the client-side of the system 100, while the listing platform 104 can be on the server-side of the system 100. The listing platform 104 can comprise server-side software designed to work in conjunction with client-side software on the user device 102 so as to implement any combination of the features and functionalities discussed in the present disclosure. For instance, the user device 102 can include an application 108 for interacting with the listing platform 104. The application 108 can be, for instance, a web browser or a dedicated application for providing functions, such as those described herein. This division of the system 100 is provided to illustrate one example of a suitable environment, and there is no requirement for each implementation that any combination of the user device 102 and the listing platform 104 remain as separate entities. While the system 100 illustrates a configuration in a networked environment with a separate user device and content server, it should be understood that other configurations can be employed in which aspects of the various components are combined. For instance, in some aspects, aspects of the listing platform 104 can be implemented at least in part by the user device 102 and vice versa.

The user device 102 may comprise any type of computing device capable of use by a user. For example, in one aspect, a user device may be the type of computing device 700 described in relation to FIG. 7 herein. By way of example and not limitation, the user device 102 may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user may be associated with the user device 102 and may interact with the listing platform 104 via the user device 102.

As shown in FIG. 1, the listing platform 104 includes a content generation component 110, a content validation component 112, a prompt tuning component 114, and a user interface component 116. The components of the listing platform 104 may be in addition to other components that provide further additional functions beyond the features described herein. The listing platform 104 can be implemented using one or more server devices, one or more platforms with corresponding application programming interfaces, cloud infrastructure, and the like. While the listing platform 104 is shown separate from the user device 102 in the configuration of FIG. 1, it should be understood that in other configurations, some of the functions and/or components of the listing platform 104 can be provided on the user device 102 or another location not shown in FIG. 1. The components can be provided by a single entity or multiple entities.

In some aspects, the functions performed by components of the listing platform 104 are associated with one or more applications, services, or routines. In particular, such applications, services, or routines may operate on one or more user devices, servers, may be distributed across one or more user devices and servers, or be implemented in the cloud. Moreover, in some aspects, these components of the listing platform 104 may be distributed across a network, including one or more servers and client devices, in the cloud, and/or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The listing platform 104 generally provides, to user devices such as the user device 102, item listings describing items available for purchase using the listing platform 104. For instance, the listing platform 104 could comprise an e-commerce platform, in which listed products are available for purchase by users of user devices upon navigation to a website of the listing platform 104. The functionality of the listing platform 104 includes provision of interfaces (e.g., via the user interface component 116) enabling surfacing of item listings for items to users of the listing platform 104. Item listings for items available for sale via the listing platform 104 are stored by the item listings data store 118. Each item listing can include a description relating to an item comprising one or more of a price in a currency, reviews, images of the item, shipment options, a rating, a condition of the item, a size of the item, a color of the item, etc. Each item listing for a part can also include fitment data, which refers to information regarding compatibility of the part with a relevant application. For instance, the fitment data for a vehicle part can include the year, make, and model of each vehicle with which the part is compatible. In aspects, each item listing is also associated with one or more item categories from a pre-defined category hierarchy for the listing platform 104, including meta-categories and leaf categories. For example, the meta-categories are each divisible into subcategories (or branch categories), whereas leaf categories are not divisible.

The content generation component 110 employs a generative model (sometimes referred to herein as a content generation model) to generate content in the form of natural language text providing summary information describing one or more items. The content generation component 110 accesses input data comprising structured data in the form of attribute-value pairs for fitment data and/or item attribute data associated with one or more items. The fitment data portion of the input data comprises attribute-value pairs providing compatibility information of the one or more items with a relevant application. The item attribute data portion of the input data comprise attribute-value pairs providing information regarding relevant attributes of the one or more items.

The input data is provided to the content generation model, which outputs content comprising natural language text providing summary information for the one or more items. The summary information can include compatibility information and/or item characteristic information for the item(s). Compatibility information describes the compatibility of the item(s) with one or more applications. Item characteristic information describes relevant attributes of the item(s). The content generation component 110 can generate content for a number of different use cases for the listing platform. In some instances, the content generation component 110 generates content for a single item listing, such as for presentation on an item page for an item listing. In other instances, the content generation component 110 generates content for multiple item listings, such as for presentation on a search results page, on a browse node page, or with a set of item listing recommendations.

By way of illustration, FIG. 2A provides an example of input data 202 for a type of tire (i.e., tire of 215/45R17 tire size). As can be seen from FIG. 2A, the input data 202 includes a series of attribute-value pairs, where each attribute-value pair provides an attribute name (e.g., "sectionWidth") and an attribute value (e.g., "215"). Some of the attribute-value pairs in the input data 202 are based on item attribute data for the type of tire, including: "sectionWidth": 215, "aspectRatio":45, and "rimDiameter":17. The other attribute-value pairs in the input data 202 are based on fitment data for the type of tire, including: "popularMake- Models": [{"make":"Toyota", "model":"Corolla"}, {"make":"Honda", "model":"Civic"}, {"make":"Hyundai", "model":"Elantra"}].

FIG. 2B provides an example of content 204 generated by a content generation model given the input data 202. The content 204 includes natural language text that provides compatibility information for the type of tire: "The 215/45R17 tire size is common on vehicles such as Toyota Corolla, Honda Civic, and Hyundai Elantra." The content 204 also includes natural language text that provides item characteristic information: "This moderate-width tire, coupled with a moderate sidewall, strikes a balance between performance and aesthetics, providing a smooth driving experience ideal for everyday use."

The content generation component 110 selects the attribute-value pairs for input data using any combination of different factors, such as, for instance: the use case (e.g., item page, search results page, browse node page, recommendations, etc.), system knowledge for the listing platform 104, and user data for a user. The use case involves where the generated content will be presented, such as on an item page, a browse node page, or a search result page, to name a few examples. System knowledge for the listing platform 104 includes information that is available from data tracked by the listing platform and analytics generated from the tracked data. This can include, for instance, query log data (e.g., user-submitted search queries with corresponding search results and user selections) and item purchase data (e.g., items purchased together or items purchased by the same user). User data includes any data available for a given user, which can include, for instance, user demographic data (e.g., age, gender, etc.), user behavior data (e.g., search queries, search result selections, purchases, etc.), and items owned by the user such as applications owned by the user with which parts need to be compatible (e.g., year/make/model of vehicles owned by the user) and parts owned by the user for those applications (e.g., tires on each of the vehicles owned by the user). The following discussion provides examples of how the content generation component 110 can identify input data for different use cases using various data sources, including system knowledge and/or user data. However, it should be understood that these are examples only as other combinations and types of data and different data sources could be employed within the scope of technology described herein.

For fitment data, when the use case involves a single item listing, the content generation component 110 can access fitment data from item data for the item listing in the item listings data store 118. For example, suppose content is being generated for an item page for an item listing for a vehicle tire, the content generation component 110 can access fitment data for that item listing from the item listings data store 118, which could specify the make/model of vehicles with which that vehicle tire is compatible. In some cases, the content generation component 110 can also leverage system knowledge when selecting the fitment data. For instance, the vehicle tire could be compatible with a large number of vehicles, and system knowledge could be used to determine the three most popular vehicle makes/models for that vehicle tire (e.g., based on knowledge of vehicles owned by users and tire purchases made by each of those users). The content generation component 110 can also employ user data to select the fitment data. For instance, the content generation component 110 could access fitment data for one or more vehicles owned by the user known to the listing platform 104. In some aspects, when the user owns multiple vehicles, the content generation component 110 could select a particular vehicle based on the item listing. For instance, if the content is being generated for an item page for a vehicle tire that is only compatible with one of the vehicles owned by the user, that vehicle could be selected for the fitment data. As another example, if the user owns a high-performance vehicle and a regular vehicle, the high-performance vehicle could be selected when the user navigates to an item page for a high-performance vehicle part.

The fitment data for a search result page use case could be based on the search input. In some instances, the search input could comprise a search query entered by the user where the user has explicitly specified fitment data. For example, if a user enters a search query, "tires for 2016 mazda cx-5", the content generation component 110 identifies the year/make/model in the search query (i.e., 2016 mazda cx-5) as the fitment data. In other instances, the search input could include item attribute data, and system knowledge could be leveraged in conjunction with the search input to identify fitment data. For example, suppose a user enters a search query, "215/45R17 tires". In this example, the content generation component 110 identifies the "215/45R17" portion of the search query as a tire size (i.e., item attribute), and the content generation component 110 can access the three most popular vehicle make/models for that tire size based on system knowledge. The content generation component 110 can also employ user data in conjunction with the search query. For instance, given the search query "215/45R17 tires", the content generation component 110 could select, from a number of known vehicles owned by the user, a particular vehicle that is compatible with that tire size.

In further aspects, the content generation component 110 can identify fitment data based on search results for the search results page. For instance, given a set of search results identifying item listings for tires, the content generation component 110 could identify the fitment data for each of those item listings (e.g., from the item listings data store 118), select the three most popular vehicles in that fitment data, and use those vehicles for the fitment data. The content generation component 110 could also employ user data in conjunction with the search result data, for instance, by selecting, from a number of known vehicles owned by the user, a particular vehicle that is compatible with the most tire item listings included in the search results. Input data for a set of item recommendations could be handled in a similar fashion based on the item listings in the set of item recommendations.

For a browse node page use case, the content generation component 110 can identify the fitment data based on the category and/or item attributes of the browse node page. In particular, a browse node page presents an indication of item listings for a given category, and in some cases, item attributes. The content generation component 110 can identify fitment data using the category and/or item attributes of the browse node page similar to how a search query is used for the search result page use case, with or without additional data, such as data from system knowledge and/or user data. In some aspects, the content generation component 110 can identify fitment data based on the item listings included on the browse node page similar to how search results are used by the search result page use case, with or without additional data, such as data from system knowledge and/or user data.

For item attribute data, when the use case involves a single item listing, the content generation component 110 can access item attribute data from item data for the item listing in the item listings data store 118. Continuing the example in which content is being generated for an item page for an item listing for a vehicle tire, the content generation component 110 can access item attribute data for that item listing from the item listings data store 118, which could specify relevant information regarding the vehicle tire for generating content, such as the tire size.

The item attribute data for a search result page use case could be based on the search input. In some instances, the search input could comprise a search query entered by the user where the user has explicitly specified item attribute data. For example, if a user enters a search query, "215/45R17 tires", the content generation component 110 identifies the "215/45R17" portion of the search query as a tire size that is the relevant item attribute data for the item listing. In other instances, the item attribute data can be based on both a search query and a known application owned by the user. For instance, suppose a user that owns only one vehicle submits a search query, "tires". In that case, the content generation component 110 can identify the tire size compatible with the vehicle owned by the user and use that tire size as the item attribute data. System knowledge could also be employed. Continuing the example, if the user's vehicle is compatible with a number of different tire sizes, the content generation component 110 could leverage system knowledge to identify the most popular tire size for that user's vehicle (e.g., based on tires purchased by other users who own the same make/model of vehicle).

In further aspects, the content generation component 110 can identify item attribute data based on search results for the search results page. For instance, given a set of search results identifying item listings for tires, the content generation component 110 could identify the tire size for each of those item listings (e.g., from the item listings data store 118), and select the tire size that appears most frequently in the search results as the item attribute data. In some cases when only a portion of item listings on a search results page are compatible with a known application owned by the user, the item attribute data can be based on item attributes from the item listings compatible with that known application. System knowledge could also be employed to select from different item attribute data identified from the search results.

For a browse node page use case, the content generation component 110 can identify the item attribute data based on the category and/or item attributes of the browse node page. As discussed above, a browse node page presents an indication of item listings for a given category, and in some cases, item attributes. The content generation component 110 can identify item attribute data using the category and/or item attributes of the browse node page similar to how a search query is used for the search result page use case, with or without additional data, such as data from system knowledge and/or user data. In some aspects, the content generation component 110 can identify item attribute data based on the item listings included on the browse node page similar to how search results are used by the search result page use case, with or without additional data, such as data from system knowledge and/or user data.

The content generation component 110 can select the fitment data and/or item attribute data for an input data based on an item category of item listing(s) involved. More particularly, the listing platform 104 can have a pre-defined category hierarchy with each item listing being assigned to one or more item categories from the category hierarchy. For use cases involving a single item listing (e.g., item page), the content generation component 110 identifies an item category of that item listing. For use cases involving multiple item listings (e.g., search results page or browse node page), the content generation component 110 identifies an item category of those item listings.

In some aspects, the item category is used to determine the type of fitment data to include in the input data. For instance, the fitment data could be make/model of a vehicle for a "tires" item category; while the fitment data could be make/model of a printer for an "ink cartridges" item category. In some aspects, the item category is used to determine the type of item attribute data to include in the input data. For instance, the item attribute data could be tire size for a "tires" item category; while the item attribute data could be page yield (i.e., estimate number of pages that can be printed) for an "ink cartridges" item category.

Some item categories can have multiple different types of item attribute data. In some aspects, all the different types of item attribute data are used in the item data; while in other aspects, only a portion of the different types of item attribute data are used. The type(s) of item attribute data to use for an input data could be based on different factors, such as user data for the user. For instance, when a number of different item attributes are available for a given item category, the content generation component 110 could leverage user data to determine which of those item attributes are most important to the user. For example, the possible item attributes for a "tires" item category could be tire size and treadwear grade (i.e., a comparative rating based on the wear rate of the tire). If user data indicates the user is more interested in how much life they can get out of a tire, the content generation component 110 could use treadwear grade as the item attribute data in the input data, while tire size is not used.

To reduce hallucinations in generated content from the content generation model, the content generation component 110 also provides one or more pre-defined generation prompts as input to the content generation model. The pre-defined generation prompts comprise text (e.g., natural language text, soft prompts, embeddings, and/or templates) that is provided as input to the content generation model to instruct or otherwise guide the content generation model to provide desired content. The text in the pre-defined generation prompts optimize how content generation tasks are presented to the content generation model to improve the content generation model's ability to understand the input data and generate relevant text with reduced hallucinations.

In some aspects, the pre-defined generation prompts can employ one-shot or few shot prompting in which one or more examples of desired output are provided. One-shot prompting involves providing a single example, while few-shot prompting involves providing two or more examples. The examples guide the content generation model in generating a desired response. For instance, the examples can serve as a template, showcasing the expected format, tone, or style for the output. The examples act as a clear reference point, helping the content generation model infer patterns and produce coherent, contextually appropriate results. In configurations in which the content generation model is intended to generate content that provides both compatibility information and item characteristic information, the one-shot or few-shot prompting can provide example(s) of how to present both types of information.

As shown in FIG. 1, the listing platform 104 includes a generation prompts data store 120, which serves as a repository of pre-defined generation prompts for the listing platform 104. Some pre-defined generation prompts in the generation prompts data store 120 can be specific to item categories, while other pre-defined generation prompts can be applicable to any item category. For instance, a pre-defined generation prompt specific to a "tires" item category could comprise: "Tire with aspectRatio<41 is considered low sidewall, aspectRatio in range 41 to 60 is considered moderate sidewall, aspectRatio>60 or higher is considered tall sidewall." An example of a pre-defined generation prompt that is generally applicable across categories is: "Do not mention any kind of guarantee, discount, warranty, promotion, or price in text response."

The content generation component 110 can select one or more pre-defined generation prompts from the generation prompts data store 120 to provide as input to the content generation model based on the content generation task. The pre-defined generation prompts can be selected by the content generation component 110 based on a number of different factors, including, for instance, the item category, the use case, system knowledge, and user data. For example, when generating content for vehicles tires, pre-defined generation prompts for a vehicle tires item category would be selected; while when generating content for ink cartridges, pre-defined generation prompts for an ink cartridges item category would be selected. As another example, different pre-defined generation prompts can be used when generating content for placement on an item page versus when generating content for placement on a search results page. As yet another example, different pre-defined generation prompts can be used when generating content for instances when user data is being employed (e.g., a vehicle make/model owned by the user) versus when general data is being employed (e.g., three most popular vehicle makes/models for a certain tire size).

By way of illustration, FIG. 3 provides example pre-defined generation prompts 302 that can be used when generating content involving vehicle tires. Some of the example pre-defined generation prompts 302 set forth rules for generating content based on attribute-value pairs in the input data. For instance, the example pre-defined generation prompts 302 include the pre-defined generation prompt: "Tire with sectionWidth<201 is considered narrow, sectionWidth in range 201 to 250 is considered moderate, sectionWidth>250 is considered wide." This example pre-defined generation prompt provides a rule that instructs the content generation model to generate text with specific item characteristic information based on the attribute value of the "sectionWidth" attribute in the input data. For example, if the input data includes the attribute-value pair, "sectionWidth":215, this example pre-defined generation prompt will cause the content generation model to generate text with item characteristic information describing the tire as having a moderate width. Other example pre-defined generation prompts provide instructions that do not involve the attribute-value pairs in the input data (e.g., "Refrain from making any negative or disparaging comments about the tire.").

After content has been generated by the content generation component 110, the content validation component 112 of the listing platform 104 validates the content to determine whether to accept or reject the content. This further enhances the ability of the listing platform 104 to prevent presentation of generated content that includes hallucinations. In particular, if content is approved by the content validation component 112, the content is provided to one or more user devices, such as the user device 102, for presentation. Alternatively, if content is rejected by the content validation component 112, the content is not provided for presentation on a user device.

To validate content from the content generation component 110, the content validation component 112 provides the content and one or more pre-defined validation prompts as input to a generative model (sometimes referred to herein as a content validation model), which generates an output comprising text that indicates the content is either accepted or rejected. The pre-defined validation prompts comprise text (e.g., natural language text, soft prompts, embeddings, and/or templates) that is provided as input to the content validation model to instruct or otherwise guide the content validation model to assess whether the generated content is valid. In some aspects, the pre-defined validation prompts can employ one-shot or few shot prompting in which one or more examples of desired output are provided. This could be used, for instance, to generate text in a particular form for cases of rejected content in order to facilitate downstream prompt tuning, as will be described in further detail below.

As shown in FIG. 1, the listing platform 104 includes a validation prompts data store 122, which serves as a repository of pre-defined validation prompts for the listing platform 104. Some pre-defined validation prompts in the validation prompts data store 122 can be specific to item categories, while other pre-defined validation prompts can be applicable to any item category. For instance, a pre-defined validation prompt specific to a "tires" item category could comprise: "Review the text and input data to determine if the text mentions: a tire width as narrow if sectionWidth<201; a tire width as moderate if sectionWidth in range 201 to 250; a tire width as wide if sectionWidth>250. If the text mentions a tire width characteristic that does not match the sectionWidth value, please generate a description of what tire width characteristic is mentioned and the sectionWidth value. Otherwise confirm that the text satisfies the requirement." An example of a pre-defined validation prompt that is generally applicable across categories is: "Review the text and determine if it mentions any of the following: guarantee, discount, warranty, promotion, or price. If any of these are mentioned, please indicate which ones are present. If none of these are mentioned, confirm that the text satisfies the requirement."

The content validation component 112 can select one or more pre-defined validation prompts from the validation prompts data store 122 to provide as input to the content validation model based on the content generation task. The pre-defined validation prompts can be selected by the content validation component 112 based on a number of different factors, including, for instance, the item category, the use case, system knowledge, and user data. For example, when content has been generated for vehicles tires, pre-defined validation prompts for a vehicle tires item category would be selected; while when content has been generated for ink cartridges, pre-defined validation prompts for an ink cartridges item category would be selected. As another example, different pre-defined validation prompts can be used when content has been generated for placement on an item page versus when content has been generated for placement on a search results page. As yet another example, different pre-defined validation prompts can be used when content has been generated using user data (e.g., a vehicle make/model owned by the user) versus when content has been generated using general data (e.g., three most popular vehicle makes/models for a certain tire size).

By way of illustration, FIG. 4 provides example pre-defined validation prompts 402 that can be used when generating content involving vehicle tires. Some of the example pre-defined validation prompts 402 set forth rules for validating content based on attribute-value pairs in the input data. For instance, the example pre-defined validation prompts 402 include the pre-defined validation prompt:

"Review the text and input data to determine if the text mentions: a tire width as narrow if sectionWidth<201; a tire width as moderate if sectionWidth in range 201 to 250; a tire width as wide if sectionWidth>250. If the text mentions a tire width characteristic that does not match the sectionWidth value, please generate a description of what tire width characteristic is mentioned and the sectionWidth value. Otherwise confirm that the text satisfies the requirement." This example pre-defined validation prompt provides a rule that instructs the content validation model to determine whether the text in the content mentions certain item characteristic information based on the attribute value of the "sectionWidth" attribute in the input data. For example, if the input data includes the attribute-value pair, "sectionWidth":215, this example pre-defined validation prompt will cause the content validation model to reject the content if the text includes a tire width characteristic other than moderate. Other example pre-defined validation prompts provide instructions that do not involve the attribute-value pairs (e.g., "Review the text and determine if it mentions any negative or disparaging comments about the tire. If any of these are mentioned, please indicate which ones are present. If none of these are mentioned, confirm that the text satisfies the requirement.").

When content is approved by the content validation component 112, the approved content can be provided for presentation on user devices, such as the user device 102. In some instances, the use case involves dynamically generating content online, such as generating content to provide on a search results page in response to search input or generating content for an item page when a user selects to view the item page. In such instances, the content is provided to the user device for presentation upon the content being approved. In other instances, the use case involves generating content offline and storing the approved content in a content data store 124, which serves as a repository of approved content. For instance, content can be generated and validated offline for an item listing, and that content can be stored in the content data store 124 (or in the item listings data store 118 with other data for the item listing). As such, the content can be retrieved from storage and provided for display on the item page for the item listing whenever users subsequently navigate to that item page.

When content is rejected by the content validation component 112, the rejected content is not provided for presentation on user devices. In some configurations, the rejected content is simply deleted and no further action is taken by the listing platform 104. In other configurations, such as that shown in FIG. 1, the rejected content is used by the prompt tuning component 114 to provide one or more tuned generation prompts. This helps to improve the ability of the listing platform 104 to reduce hallucinations in generated content.

The input to the prompt tuning component 114 can include the rejected content, text output from the content validation component 112 regarding why the content was rejected, one or more pre-defined validation prompts that resulted in the content being rejected, and/or one or more pre-defined generation prompts associated with why the content was rejected. In some instances, the input to the prompt tuning component 114 can also include a pre-defined prompt that instructs the prompt tuning component on how to generate one or more tuned generation prompts.

The output of the prompt tuning component 114 comprises one or more tuned generation prompts, which are added to the generation prompts data store 120. In some instances, the prompt tuning component 114 generates a new generation prompt. In other instances, the prompt tuning component 114 provides a tuned generation prompt that replaces a previous pre-defined generation prompt. This can address situations in which a given pre-defined generation prompt is not sufficiently resulting in generated content with no hallucinations.

A tuned generation prompt from the prompt tuning component 114 can be used to generate content for subsequently-received input data with the goal of generating the content such that it does not include hallucinations that led to the previous content being rejected. In some aspects, a tuned generation prompt from the prompt tuning component 114 can be used to generate new content for the same input data that resulted in the generation of the rejected content, and the new content can be validated by the content validation component 112. The process of generating, validating, and prompt tuning can be repeated for a given input data until the content generated for the input data is approved by the content validation component 112.

In various configurations of the technology described herein, the generative model used by each of the content generation component 110, the content validation component 112, and the prompt tuning component 114 can comprise the same model or different models. Each generative model employed can comprise a language model that includes a set of statistical or probabilistic functions to perform NLP in order to understand, learn, and/or generate human natural language text and code. For example, a language model can be a tool that determines the probability of a given sequence of words occurring in a sentence, natural language sequence, and/or code. A language model is called a large language model (LLM) when it is trained on enormous amount of data and/or has a large number of parameters. Some examples of LLMs are GOOGLE's BERT and OpenAI's GPT-4. These models have capabilities ranging from writing a simple essay to generating complex computer codes—all with limited to no supervision. Accordingly, an LLM can comprise a deep neural network that is very large (e.g., billions to hundreds of billions of parameters) and understands, processes, and produces human natural language and code by being trained on massive amounts of text. These models can predict future words in a sequence letting them, for instance, generate sentences similar to how humans talk and write or otherwise in a form dictated, for instance, by a prompt.

In accordance with some aspects, each generative model employed by the listing platform 104 comprises a neural network (i.e. an artificial neural network). As used herein, a neural network comprises multiple operational layers, including an input layer and an output layer, as well as any number of hidden layers between the input layer and the output layer. Each layer comprises neurons. Different types of layers and networks connect neurons in different ways. Neurons have weights, an activation function that defines the output of the neuron given an input (including the weights), and an output. The weights are the adjustable parameters that cause a network to produce a correct output.

In some configurations, a generative model used by the listing platform 104 can be a pre-trained model (e.g., GPT-4, Llama 2, etc.) that has not been fined-tuned. In other configurations, a generative model can be a model that is built and trained from scratch or a pre-trained model that has been fine-tuned. In such configurations, a generative model can be trained or fine-tuned using training data. For instance, the training data could comprise training samples, where each training sample can include input data and ground truth data. For example, a training sample for the content generation model could comprise a sample input data paired with a sample content as ground truth data. During training, weights associated with each neuron can be updated. Originally, the generative model can comprise random weight values or pre-trained weight values that are adjusted during training. In one aspect, the generative model is trained using backpropagation. The backpropagation process comprises a forward pass, a loss function, a backward pass, and a weight update. For instance, a forward pass could comprise providing a sample input from a training sample to the generative model, which generates an output. A loss could then be determined based on a comparison of the output and the ground truth data from the training sample, and weights of the generative model are updated based on the loss. This process is repeated using the training data. The goal is to update the weights of each neuron (or other model component) to cause the generative model to produce useful output when given prompts. Once trained, the weight associated with a given neuron can remain fixed. The other data passing between neurons can change in response to a given input. Retraining the network with additional training data can update one or more weights in one or more neurons.

The listing platform 104 further includes a user interface component 116 that provides one or more user interfaces for interacting with the listing platform 104. The user interface component 116 provides one or more user interfaces to user devices, such as the user device 102. In some instances, the user interfaces can be presented on the user device 102 via the application 108, which can be a web browser or a dedicated application for interacting with the listing platform 104. Among other things, the user interface component 116 provides user interfaces for interacting with the listing platform 104 to receive user input and provide web pages (e.g., search result pages, browse node page, item pages, etc.) with content generated by the content generation component 110 and validated by the content validation component 112.

Figure 5:
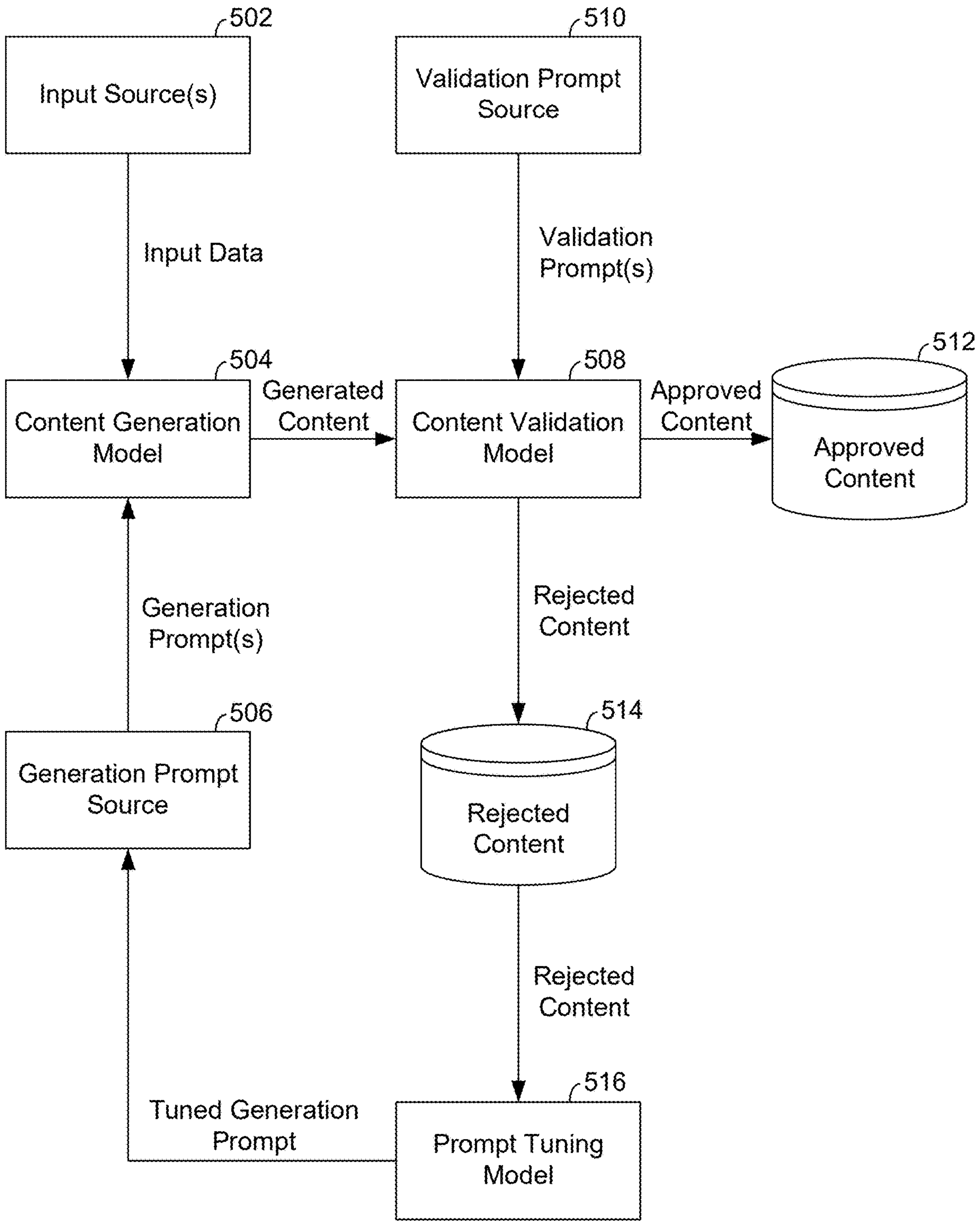
FIG. 5 is a block diagram showing an example operation of content generation and validation for parts in accordance with some implementations of the present disclosure.

Turning next to FIG. 5, a block diagram is provided illustrating overall operation of content generation and validation for parts in accordance with some aspects of the technology described herein. As shown in FIG. 5, input data is accessed from one or more input sources 502, which can include, for instance, item listing data, search input, search results, browse node data, user data, and system knowledge. The input data comprises attribute-value pairs that can be selected based on, for instance, the item category involved, the use case involved, whether user data is available, and/or system knowledge. The input data is provided to a content generation model 504. Additionally, one or more pre-defined generation prompts are selected from a generation prompt source 506 (e.g., a repository of pre-defined generation prompts), and the selected pre-defined generation prompt(s) are provided to the content generation model 504. The pre-defined generation prompt(s) provided to the content generation model 504 can be selected based on, for instance, the item category involved, the use case involved, whether user data is available, and/or system knowledge.

Given the input data and the pre-defined generation prompt(s), the content generation model 504 outputs generated content. The generated content is provided to a content validation model 508. Additionally, one or more pre-defined validation prompts are selected from a validation prompt source 510 (e.g., a repository of pre-defined validation prompts), and the selected pre-defined validation prompt(s) are provided to the content validation model 508. The pre-defined validation prompt(s) provided to the content validation model 508 can be selected based on, for instance, the one or more pre-defined generation prompts used to generate the content, the item category involved, the use case involved, whether user data is available, and/or system knowledge.

Using the selected pre-defined validation prompt(s) and the text of the generated content as input, the content validation model 508 validates the generated content to determine whether to approve the generated content or to reject the generated content. When the generated content is approved, the approved content can be stored in an approved content data store 512, as shown in FIG. 5, and/or the approved content can be transmitted over a network to a user device for presentation.

When the generated content is rejected, in the configuration shown in FIG. 5, the rejected content and/or associated data can be stored in a rejected content data store 514. An input is provided to a prompt tuning model 516 based on the rejected content. The input can include, for instance, the rejected content, text output by the content validation model 508 regarding why the content was rejected, one or more pre-defined validation prompts that resulted in the content being rejected, and/or one or more pre-defined generation prompts associated with why the content was rejected. The prompt tuning model 516 outputs one or more tuned generation prompts, which are added to the generation prompt source 506. In some instances, a new tuned generation prompt is generated and added to the generation prompt source 506. In other instances, a tuned generation prompt is generated by tuning an existing pre-defined generation prompt, and the existing pre-defined generation prompt is replaced by the tuned generation prompt in the generation prompt source 506.

Example Method for Summary Content Generation and Validation for Parts

Figure 6:
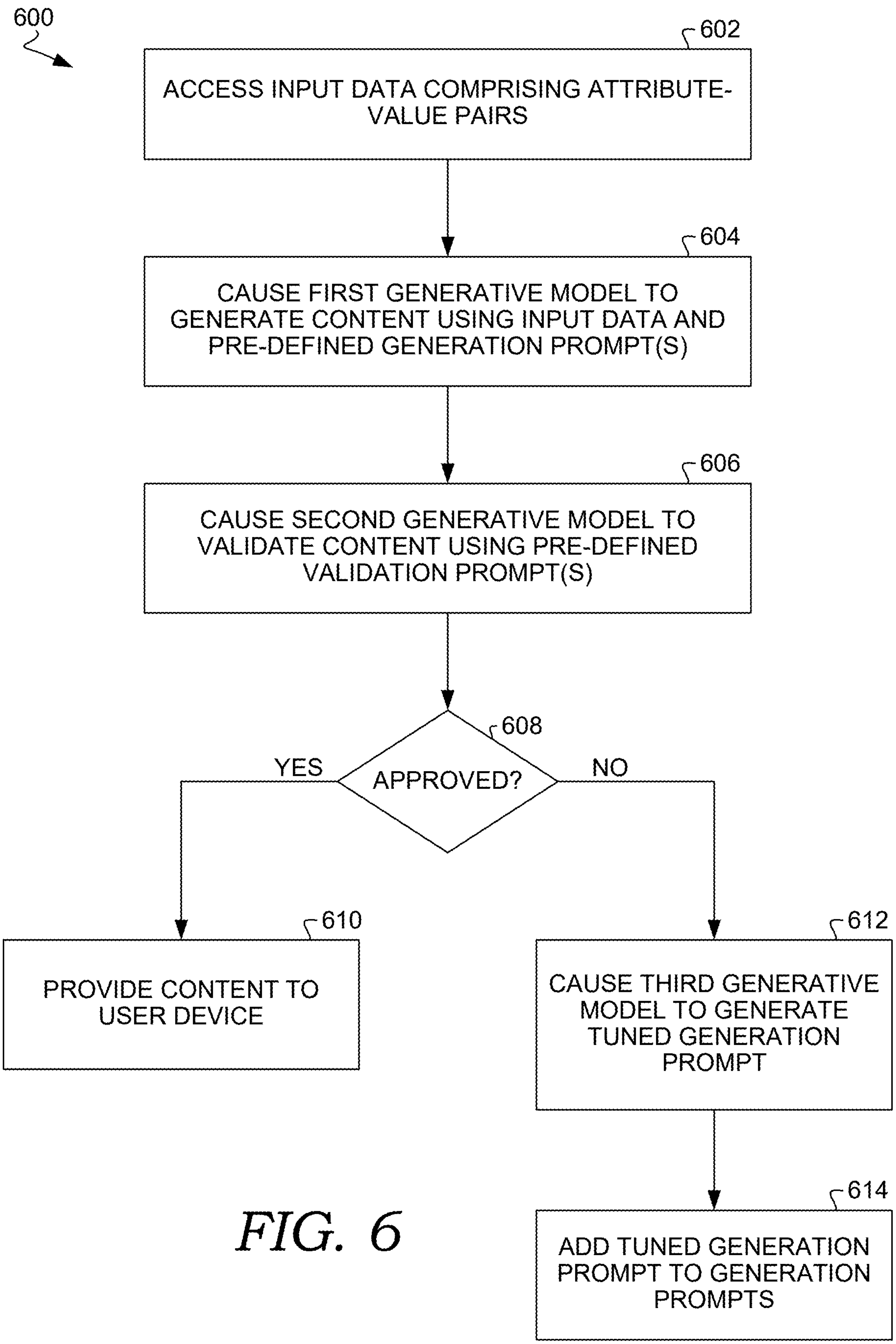
FIG. 6 is a flow diagram showing a method for generating and validating content with summary information for parts in accordance with some implementations of the present disclosure.

With reference now to FIG. 6, a flow diagram is provided that illustrates a method 600 for generating and validating content with summary information for parts. The method 600 can be performed, for instance, by components of the listing platform 104 of FIG. 1. Each block of the method 600 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 602, input data is accessed for content generation for one or more item listings. The input data includes structured data in the form of attribute-value pairs. In some aspects, the input data can include one or more attribute-value pairs for fitment data and one or more attribute-value pairs for item attribute data relevant to one or more items for which content is being generated. The attribute-value pairs to include in the input data can be selected based on, for instance, the item category involved, the use case involved, whether user data is available, and/or system knowledge.

A first generative model (e.g., a content generation model) generates content using the input data and one or more pre-defined generation prompts, as shown at block 604. The one or more pre-defined generation prompts can be selected from a repository of pre-defined generations prompts based on, for instance, the item category involved, the use case involved, whether user data is available, and/or system knowledge. The first generative model utilizes the input data along with the one or more pre-defined generation prompts to generate content comprising natural language text as output. The generated content can include compatibility information and/or item characteristic information for the one or more item listings for which the content has been generated.

As shown at block 606, a second generative model (e.g., a content validation model) validates the content using one or more pre-defined validation prompts. The one or more pre-defined validation prompts can be selected from a repository of pre-defined validation prompts based on, for instance, the one or more pre-defined generation prompts used to generate the content, the item category involved, the use case involved, whether user data is available, and/or system knowledge. The second generative model uses the one or more pre-defined validation prompts to assess the accuracy of the content. The validation process ensures that the content does not contain hallucinations, ensuring the accuracy of the information provided to users.

If it is determined at block 608 that the content is approved based on the validation, the approved content is provided to a user device for presentation, as shown at block 610. In some aspects, the approved content is provided to a user device upon generation and approval (e.g., for use cases involving online content generation). In other aspects, the approved content is stored in a content repository and subsequently provided to a user device (e.g., for use cases involving offline content generation).

Alternatively, it is determined at 608 that the content is rejected based on the validation. In some configurations, the process ends at that point. In the configuration of FIG. 6, however, a third generative model (e.g., a prompt tuning model) generates a tuned generation prompt, as shown at block 612. The third generative model can generate a tuned generation prompt based on, among other things, the rejected content and the reasons for its rejection.

As shown at block 614, the tuned generation prompt is added to the repository of generation prompts. In some aspects, the tuned generation prompt is a new pre-defined generation prompt added to the repository; while in other aspects, the tuned generation prompt replaces an existing pre-defined generation prompt in the repository. Although not shown in FIG. 6, the tuned generation prompt can be used to generate content for subsequently-accessed input data and/or to generate new content for the input data accessed at block 602.

Exemplary Operating Environment

Figure 7:
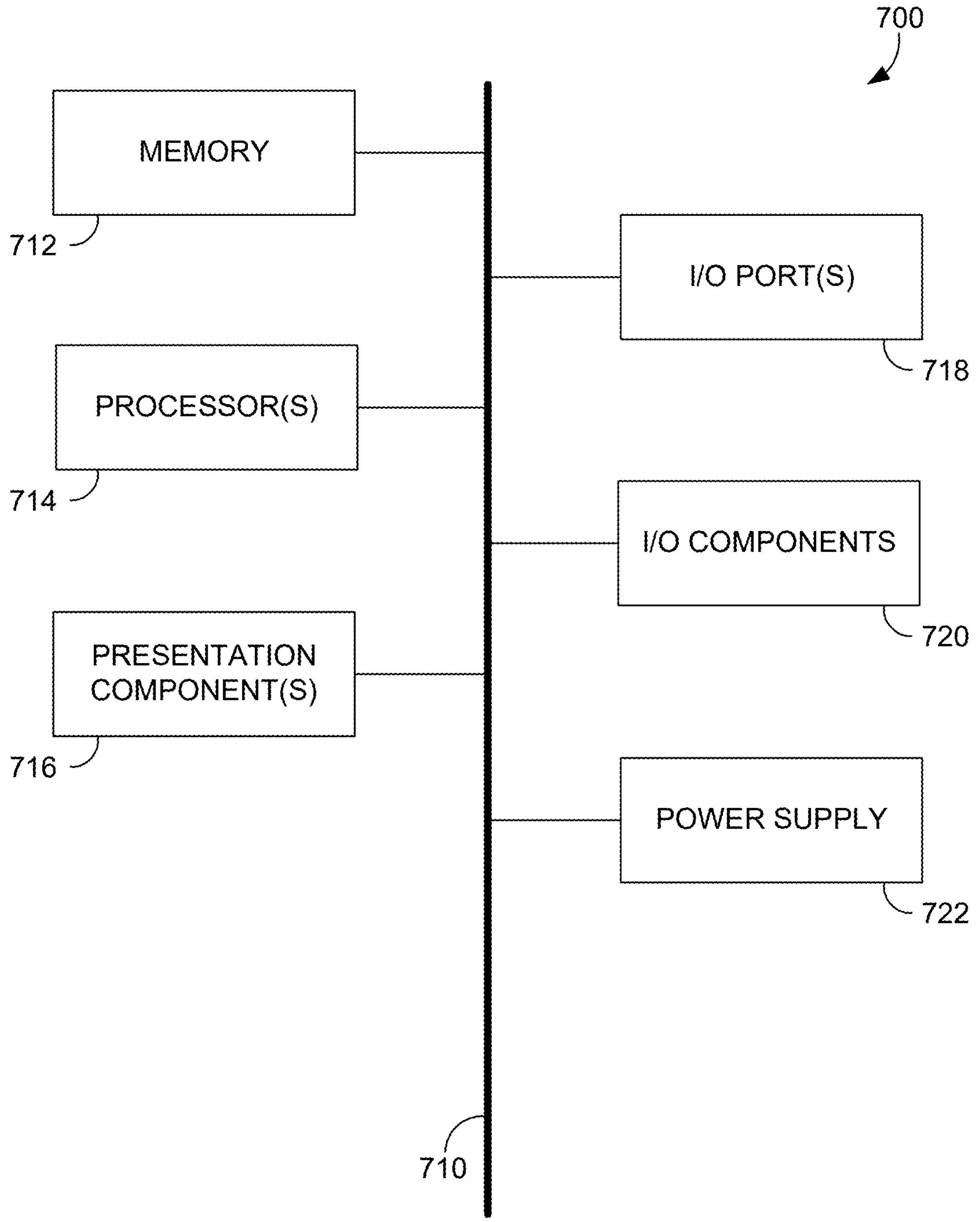
FIG. 7 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 7 in particular, an exemplary operating environment for implementing embodiments of the present technology is shown and designated generally as computing device 700. Computing device 700 is but one example of a suitable computing environment and is not intended to suggest any limitation as to the scope of use or functionality of the technology. Neither should the computing device 700 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what can be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present technology. Distinction is not made between such categories as “workstation,” “server,” “laptop,” “hand-held device,” etc., as all are contemplated within the scope of FIG. 7 and reference to “computing device.”

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. The terms “computer storage media” and “computer storage medium” do not comprise signals per se.

Communication media typically embodies computer-readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory can be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which can be built in. Illustrative components include a microphone, joystick, game pad, satellite dish, scanner, printer, wireless device, etc. The I/O components 720 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 can be equipped with depth cameras, such as, stereoscopic camera systems, infrared camera systems, RGB camera systems, and combinations of these for gesture detection and recognition. Additionally, the computing device 700 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, unless indicated otherwise, the term "or" includes the conjunctive, the disjunctive, and both (a or b thus includes either a or b, as well as a and b). Further, the term "and/or" includes the conjunctive, the disjunctive, and both (a and/or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed:

1. One or more computer storage media storing computer-useable instructions that, when used by one or more servers of a listing platform, cause the one or more servers to perform operations, the operations comprising:

accessing, by at least one of the one or more servers of the listing platform, a first input data from an item listings data store of the listing platform, the first input data comprising a first plurality of attribute-value pairs for attributes of a first part item from a first part item listing on the listing platform, the first part item comprising a physical item having one or more compatibility requirements with one or more other physical items, the first plurality of attribute-value pairs for the attributes of the first part item providing information regarding the compatibility requirements;

causing, by at least one of the one or more servers of the listing platform, a first generative model to generate a first content for the first part item listing by providing one or more pre-defined generation prompts and the first input data including the first plurality of attribute-value pairs to the first generative model, the first content comprising natural language text providing compatibility information for the first part item;

causing, by at least one of the one or more servers of the listing platform, a second generative model to determine whether the first content is valid based on consistency of the natural language text of the first content with the compatibility requirements by providing one or more pre-defined validation prompts and the first content and the first plurality of attribute-value pairs to the second generative model;

when a first output from the second generative model indicates the first content is valid, providing, by at least one of the one or more servers of the listing platform, the first content for presentation on a user device in association with the first part item listing; and when the first output from the second generative model indicates the first content is not valid, withholding the first content from presentation on the user device in association with the first part item listing.

2. The one or more computer storage media of claim 1, wherein the first plurality of attribute-value pairs comprises one or more attribute-value pairs for fitment data for the one or more part item listings and one or more attribute value pairs for item attribute data for the one or more part item listings.

3. The one or more computer storage media of claim 2, wherein the one or more attribute-value pairs for the fitment data and/or the one or more attribute-value pairs for the item attribute data are based on at least one selected from the following: search input, search results, browse node attributes, user data, and system knowledge.

4. The one or more computer storage media of claim 1, wherein the operations further comprise:

accessing a second input data comprising a second plurality of attribute-value pairs for one or more second part item listings;

causing the first generative model to generate a second content for the one or more second part item listings by providing the one or more pre-defined generation prompts and the second input data to the first generative model;

causing the second generative model to validate the second content by providing the one or more pre-defined validation prompts and the second content to the second generative model;

responsive to a second output from the second generative model rejecting the second content, causing a third generative model to generate a first tuned generation prompt by providing the second content and at least a portion of the second output from the second generative model to the third generative model; and adding the first tuned generation prompt to a repository of pre-defined generation prompts.

5. The one or more computer storage media of claim 4, wherein the first tuned generation prompt is generated for a first pre-defined generation prompt from the one or more pre-defined generation prompts; and wherein adding the first tuned generation prompt to the repository of pre-defined generation prompts comprises replacing the first pre-defined generation prompt in the repository of pre-defined generation prompts with the first tuned generation prompt.

6. The one or more computer storage media of claim 4, wherein the first generative model, the second generative model, and the third generative model comprise a same generative model.

7. The one or more computer storage media of claim 4, wherein the operations further comprise:

accessing a third input data comprising a third plurality of attribute-value pairs;

causing the first generative model to generate a third content by providing the one or more pre-defined generation prompts including the first tuned generation prompt and the third input data to the first generative model;

causing the second generative model to validate the third content by providing the one or more pre-defined validation prompts and the third content to the second generative model; and responsive to a third output from the second generative model approving the third content, providing the third content for presentation on a user device.

8. The one or more computer storage media of claim 7, wherein the third input data comprises the second input data.

9. The one or more computer storage media of claim 1, wherein the operations further comprise:

determining a first item category for the first input data; and selecting the one or more pre-defined generation prompts based on the first item category.

10. The one or more computer storage media of claim 9, wherein the operations further comprise:

selecting the one or more pre-defined validation prompts based on the first item category.

11. The one or more computer storage media of claim 10, wherein the operations further comprise:

accessing a second input data comprising a second plurality of attribute-value pairs for one or more second part item listings;

determining a second item category for the second input data;

selecting a second set of one or more pre-defined generation prompts based on the second item category;

causing the first generative model to generate a second content for the one or more second part item listings by providing the second set of one or more pre-defined generation prompts and the second input data to the first generative model;

selecting a second set of one or more pre-defined validation prompts based on the second item category; and causing the second generative model to validate the second content by providing the second set of one or more pre-defined validation prompts and the second content to the second generative model.

12. A computer-implemented method comprising:

accessing, by at least one of one or more servers of the listing platform, a first input data from an item listings data store of the listing platform, the first input data comprising a first plurality of attribute-value pairs for attributes of a first part item from a first part item listing on the listing platform, the first part item comprising a physical item having one or more compatibility requirements with one or more other physical items, the first plurality of attribute-value pairs for the attributes of the first part item providing information regarding the compatibility requirements;

causing, by at least one of the one or more servers of the listing platform, a first generative model to generate a first content for the first part item listing by providing one or more pre-defined generation prompts and the first input data including the first plurality of attribute-value pairs to the first generative model, the first content comprising natural language text providing compatibility information for the first part item;

causing, by at least one of the one or more servers of the listing platform, a second generative model to determine whether the first content is valid based on consistency of the natural language text of the first content with the compatibility requirements by providing one or more pre-defined validation prompts and the first content and the first plurality of attribute-value pairs to the second generative model;

responsive to a first output from the second generative model rejecting the first content, withholding the first content from presentation on a user device in association with the first part item listing and causing, by at least one of the one or more servers of the listing platform, a third generative model to generate a first tuned generation prompt by providing to the third generative model one or more selected from the following: the first content, and at least a portion of the first output from the second generative model; and adding, by at least one of the one or more servers of the listing platform, the first tuned generation prompt to a repository of pre-defined generation prompts.

13. The computer-implemented method of claim 12, wherein the method further comprises:

accessing a second input data comprising a second plurality of attribute-value pairs;

causing the first generative model to generate a second content by providing the one or more pre-defined generation prompts including the first tuned generation prompt and the second input data to the first generative model;

causing the second generative model to validate the second content by providing the one or more pre-defined validation prompts and the second content to the second generative model; and responsive to a second output from the second generative model approving the second content, providing the second content for presentation on a user device.

14. The computer-implemented method of claim 13, wherein the second input data comprises the first input data.

15. The computer-implemented method of claim 13, wherein the second input data is based on one or more second part item listings.

16. The computer-implemented method of claim 12, wherein the method further comprises:

selecting the one or more pre-defined generation prompts based on one or more selected from the following: an item category of the one or more part item listings, a use case for which the first content is being generated, user data, and system knowledge.

17. The computer-implemented method of claim 12, wherein the method further comprises:

selecting the one or more pre-defined validation prompts based on one or more selected from the following: the one or more pre-defined generation prompts, an item category of the one or more part item listings, a use case for which the first content is being generated, user data, and system knowledge.

18. A listing platform having one or more servers comprising:

a processor; and a computer storage medium storing computer-useable instructions that, when used by the processor, causes the listing platform to perform operations comprising:

accessing, by at least one of the one or more servers of the listing platform, input data from an item listings data store of the listing platform, the input data comprising a plurality of attribute-value pairs for attributes of a first part item from a first part item listing on the listing platform, the plurality of attribute-value pairs comprising one or more attribute-value pairs for fitment data for the first part item listing and one or more attribute-value pairs for item attribute data for the first part item listing, the part item comprising a physical item having one or more compatibility requirements with one or more other physical items;

selecting, from a repository of pre-defined generation prompts, one or more pre-defined generation prompts for the input data;

causing, by at least one of the one or more servers of the listing platform, a first generative model to generate content by providing the one or more pre-defined generation prompts and the input data including the fitment data and the item attribute data to the first generative model, the content comprising natural language text providing summary information for the a first part item listing including compatibility information and item characteristic information;

causing, by at least one of the servers of the listing platform, a second generative model to determine whether the content is valid based on consistency of the natural language text of the content with the fitment data and the item attribute data by providing one or more pre-defined validation prompts and the content and the plurality of attribute-value pairs to the second generative model;

when a first output from the second generative model indicates the content is valid, providing, by at least one of the one or more servers of the listing platform, the content within a web page communicated to a user device for presentation; and when the first output from the second generative model indicates the first content is not valid, withholding the first content from presentation on the user device in association with the first part item listing.

19. The listing platform of claim 18, wherein the operations further comprises:

causing a second generative model to validate the content by providing one or more pre-defined validation prompts and the content to the second generative model, wherein the content is provided within the web page communicated to the user device responsive to an output from the second generative model approving the content.

* * * * *